No. 702,644. Patented June 17, 1902.
M. P. GERBING.
CAR WHEEL.
(Application filed Jan. 31, 1902.)
(No Model.)
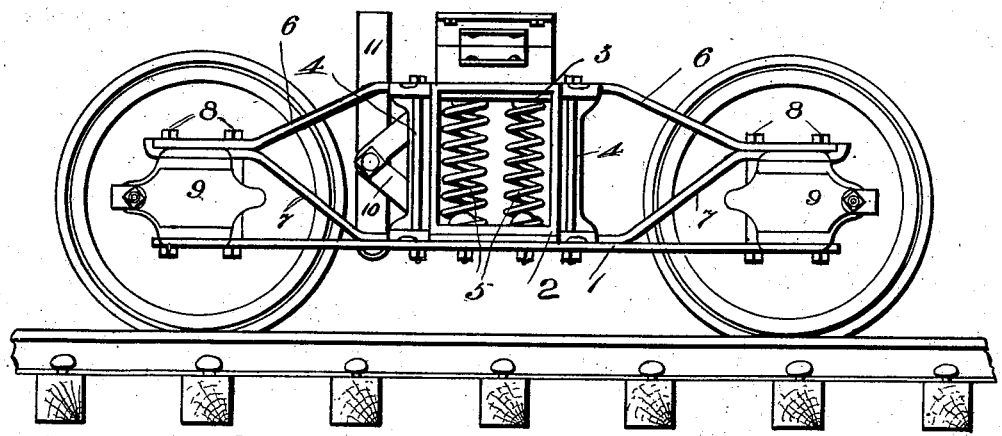
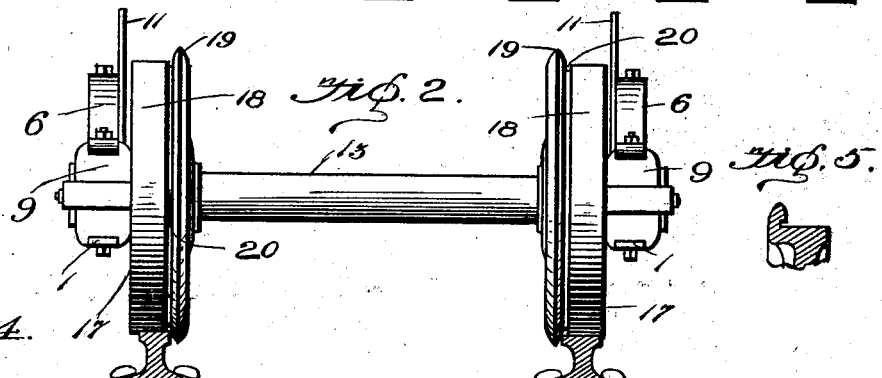
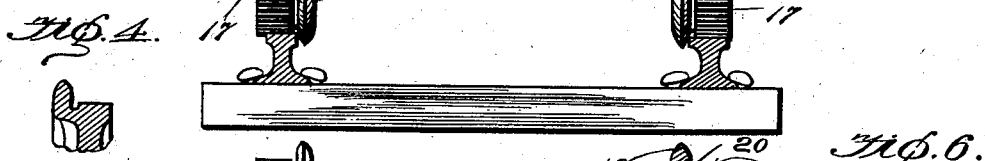
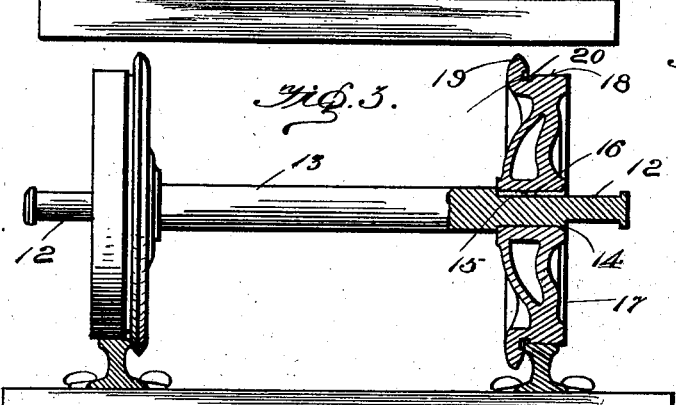
Witnesses
Bernard M. Offutt
W. G. Crowley
Inventor
Max P. Gerbing,
by David P. Moore,
Attorney

UNITED STATES PATENT OFFICE.

MAX P. GERBING, OF WENTWORTH, MISSOURI.

CAR-WHEEL.

SPECIFICATION forming part of Letters Patent No. 702,644, dated June 17, 1902.

Application filed January 31, 1902. Serial No. 91,988. (No model.)

*To all whom it may concern:*

Be it known that I, MAX P. GERBING, a citizen of the United States, residing at Wentworth, in the county of Newton and State of Missouri, have invented certain new and useful Improvements in Car Wheels and Trucks, of which the following is a specification.

This invention relates to improvements in railway-car wheels and trucks; and the object of my invention is the provision of a simple form of truck which has journaled therein an axle carrying car-wheels which are so constructed as to prevent the track from wearing round upon its inner edges or corner of the rail, and consequently lessen the wear and tear upon the flange of the car-wheel.

To attain the desired objects, my invention consists of a truck and car-wheel embodying novel features of construction and combination of parts, substantially as disclosed herein.

In the accompanying drawings, Figure 1 is a side elevation of my car-truck with the wheels in position therein. Fig. 2 is an end view thereof. Fig. 3 is a sectional view of two railway-tracks with two of my wheels in position thereon, one of said wheels being shown in sections. Figs. 4, 5, and 6 are detail sections of the upper or peripheral edges of car-wheels with my invention shown in modification.

Referring to the drawings, the numeral 1 designates the lower cross-bar of the truck, to which is bolted the plate 2, which is connected to the upper plate 3 by means of the bolt 4, so that the springs 5, which are connected, respectively, to the plates 2 and 3, will produce a cushioned effect for the truck. Connected to the plates 3 are the two downwardly-inclined arms 6, whose ends are also connected to the upwardly-inclined arms 7 by means of the bolts 8, which also connect the lower cross-bar 1, so that the journal-boxes 9 are supported therebetween. Connected to the truck by means of the lever 10 is a vertical strip 11.

Mounted in the journal-boxes 9 are the reduced ends 12 of the car-axles 13, said axles being provided with the annular ring or shoulder 14 and a longitudinal groove 15, in which fits a key 16, said ring and key being adapted to hold the wheel 17 securely on the axle. The ring 14 is adapted to be riveted on the wheel, and thus, with the key, assures
a rigid structure. The wheel is provided with the plane periphery 18 and the peripheral flange 19, a groove 20 being provided at the junction of the flange and plane 18 and may be of any desired shape—such, for instance, as shown in Fig. 3, where it extends under the flange, so that its center is in direct alinement with the inner side of the flange and is substantially square in cross-section. In Fig. 4 I have shown the groove formed at the meeting edge of the flange and plane, its inner side being in direct alinement with the inner side of the flange. In Fig. 5 I have shown the groove as formed in the flange 19 and having its lower edge in direct alinement with the plane 18 of the wheel. In Fig. 6 the groove is substantially circular in cross-section and is provided so as to be depressed below the junction of the plane 18 and the flange 19. It will also be noted that the inner edge 21 of the flange 19 is rounded in order that less wear on the inside of the rail is also guaranteed.

From the foregoing description it is evident that I provide a car-truck of comparatively simple construction and wheels to be journaled therein, which are provided with a means to prevent the tearing or flattening of the inner edge of the track-rails, said means being readily provided in the wheels when the same are cast and which will add comparatively little expense in such addition.

What I claim as new, and desire to secure by Letters Patent, is—

1. A railway-car wheel provided with an annular groove at the junction of its flange and plane, and a central opening having its outer mouth flaring.

2. A railway-car wheel, comprising the central hub having an axle opening therethrough with a flaring outer mouth and a recess the full length of the opening, a periphery integral with the hub and a flange extending beyond said periphery, said periphery and flange being provided with an annular groove at their junction.

In testimony whereof I affix my signature in presence of two witnesses.

MAX P. GERBING.

Witnesses:
GEO. A. GERBING,
W. A. TOWNES.